United States Patent [19]
Amirkiai et al.

[11] Patent Number: 6,108,162
[45] Date of Patent: Aug. 22, 2000

[54] LOW PROFILE DISK DRIVE ARCHITECTURE WITH IN-LINE CIRCUIT BOARD AND FLEX CIRCUIT PRESSURE PIN CONNECTOR

[75] Inventors: Maziar Amirkiai, Sunnyvale; Ali Hosseinzadeh, Fremont; Philip W. Rich, San Jose, all of Calif.

[73] Assignee: Quantum Corporation, Milpitas, Calif.

[21] Appl. No.: 08/876,115

[22] Filed: Jun. 13, 1997

Related U.S. Application Data

[63] Continuation of application No. 08/588,641, Jan. 19, 1996, abandoned.

[51] Int. Cl.$^7$ ............................................. G11B 17/02
[52] U.S. Cl. ............................................. 360/97.01
[58] Field of Search ........................... 360/97.01–99.12; 29/603.03

[56] References Cited

U.S. PATENT DOCUMENTS

| | | | |
|---|---|---|---|
| 4,639,863 | 1/1987 | Harrison et al. | 364/200 |
| 5,025,336 | 6/1991 | Morehouse et al. | 360/97.02 |
| 5,235,482 | 8/1993 | Schmitz | 360/97.02 |
| 5,414,574 | 5/1995 | Boutaghou et al. | 360/97.01 |
| 5,454,157 | 10/1995 | Ananth et al. | 29/603.03 |

FOREIGN PATENT DOCUMENTS 0 534 745  3/1993  European Pat. Off. .

OTHER PUBLICATIONS

Product Brochure, JVC DD–3824R/JD–3812M–Series 3 1/2 Inch Hard Disk Drives, Victor Company of Japan, U.S. Publication, Nov. 1986 (COMDEX Show, Las Vegas, NV).

*Primary Examiner*—Robert S. Tupper
*Attorney, Agent, or Firm*—David B. Harrison

[57] ABSTRACT

A hard disk drive includes a spindle motor flex circuit having a connection end secured to a drive base at a location established by a reference feature and an actuator flex circuit having a connection end also secured to the base at the location established by the feature; a cover and cover gasket mounted to the base plate enclose and seal a rotating data storage disk, a disk spindle motor, a magnet structure, a rotary actuator assembly and the flex circuits except for the spindle motor connection end and the actuator connection end; and, a printed circuit board carrying drive electronics has a connector array of pressure pins aligned to contact facing connecting pads of the flex circuits, the connector array having an alignment pin for registering with the reference feature of the base plate as the printed circuit board is mounted to the base plate externally of the cover, thereby establishing electrical connections between the printed circuit board and the flex circuit connection pads. This arrangement results in an in-line circuit board and a low-profile disk drive, lending itself to simplified assembly by manufacturing robots.

18 Claims, 6 Drawing Sheets

LOW PROFILE DISK DRIVE ARCHITECTURE WITH IN-LINE CIRCUIT BOARD AND FLEX CIRCUIT PRESSURE PIN CONNECTOR

This application is a continuation of application Ser. No. 08/588,641, filed Jan. 19, 1996, now abandoned.

FIELD OF THE INVENTION

The present invention relates to hard disk drive designs. More particularly, the present invention achieves an improved and simplified architecture and assembly process.

BACKGROUND OF THE INVENTION

Hard disk drives have evolved to very small, yet essentially standardized packages, known in the art as "footprint" or "form factor". Essentially, a hard disk drive form factor is a three dimensional space which the drive occupies within an operating environment. Frequently, but not always, the hard disk drive form factor follows dimensions of a space or "well" set aside within a computer case or housing for holding a floppy disk drive, and it is a common practice to have hard disk drives follow the exterior envelope dimensions of floppy disk drives. Hard disk drive form factors which have become de facto standards include the 8-inch form factor, 5¼ inch full height form factor, 5¼ inch half height (1.6 inch) form factor, 3½ inch full height (1.6 inch) form factor, 3½ reduced height (one inch or less) form factor, 2½ inch form factor, 1.8 inch form factor, and even a 1.3 inch form factor.

One dimension that tends to vary is the height dimension (as contrasted with the length and width dimensions). The height dimension or drive thickness is sometimes minimized, and hard disk drives which have reduced heights are known in the art. In some applications reduced-height hard disk drives are desired for a particular application, and a number of prior examples are available to establish the state of the art.

A number of factors have limited the amount of height reduction which has been realized in previous hard disk drive designs. Among these factors are disk-to-disk spacing with multiple disk drives, head gimbal assembly sizes and relative heights, actuator structures, etc., within the electromechanical portion of the hard disk drive known as "head/disk assembly". The other major subsystem of the hard disk drive is the electronics circuit board which has conventionally been secured to the head/disk assembly along one of the major walls of the drive unit, either adjacent to the base, or adjacent to the cover. The electronics circuit board has been a significant height limiting factor. While advances in miniaturization and large scale integration of electronics functions have aided reducing the size of drive electronics circuit boards, those size reductions have not, alone, been sufficient to overcome the conventional drawbacks with printed circuit board placement in the completed drives. Where a reduced height has become a design goal in the disk drive architecture, a number of approaches have been proposed involving rearrangement of the drive electronics circuit boards.

In commonly assigned U.S. Pat. No. 4,639,863 to Harrison et al., entitled: "Modular Unitary Disk File Subsystem", the drive electronics circuit board was arranged in an end-to-end alignment with the head/disk assembly so that the module could fit within an electronics expansion slot of e.g. a personal computer, rather than into the conventional floppy disk drive bay. Further, a small electronic integrated circuit board for driving a disk spindle motor was located in a well in the base of the head/disk assembly. While this approach worked well, it's result was to extend the length dimension of the assembled module.

In U.S. Pat. No. 5,025,336 to Morehouse et al., entitled: "Disk Drive Apparatus", overall height was reduced by reducing the height of the disk spindle motor assembly and rotary voice coil actuator, and by carefully placing electronic integrated circuits on a circuit board to occupy recesses formed in the drive base as contoured to accommodate the electromechanical components. This prior patent describes two flex circuits 92 and 94, shown in FIGS. 1 and 3, which carry head signals and motor driving currents between the printed circuit board and the actuator and spindle motor.

Another prior approach is illustrated by U.S. Pat. No. 5,235,482 to Schmitz, entitled: "Magnetic Disk Drive Incorporating a Mechanically Damped Base". In the approach of this patent, certain rectangular openings were defined in the sheet metal base of a size adapted to receive integrated circuit packages therethrough without shorting them out. A double-faced adhesively coated gasket, also having the same openings was then sandwiched between the base, and a printed circuit board carrying the drive electronics including the integrated circuit packages which protruded through the openings in the gasket and the base. Of note in this prior patent is a flex circuit in FIG. 13 which is described as carrying head signals and actuator coil currents from a connector end 1314 to delivery ends 1320 and 1326 on the actuator arm.

A further prior approach is described in U.S. Pat. No. 5,414,574 to Boutaghou et al., entitled: "Hybrid Base for Ultrathin Disk Drives". This patent describes a hybrid base plate and circuit board comprising a printed circuit board carrying the drive electronics and also including centrally a rigid metal insert for supporting the spindle motor and rotary actuator in relative alignment. The practice of using the drive base as the printed circuit board was also followed in the Victor Company of Japan, Limited, JVC J-D3812R and 3824R series of disk drives announced in 1986. In those drives, the base comprised a laminar printed circuit construction formed on top of a metal substrate.

One more example of a height reduced hard disk drive is described in European Patent Office Publication No. 0 534 745, entitled: "High Capacity, Low Profile Disk Drive System". This prior design features a circuit board in line with the storage disks and which slides into grooves 11c in a cover. The circuit board includes a connector which mates with another connector of a flex circuit leading to components in the enclosed space of the drive including voice coil actuator, heads preamplifier, spindle motor, etc. Another example of drive electronics circuit boards which are in line with the storage disks is provided in U.S. Pat. No. 5,038,239 to Vettel et al., entitled: "Integrated Electronic Card-Frame Assembly for a Rigid Disk Drive".

In another example known in the art, described for example in commonly assigned, pending U.S. patent application Ser. No. 08/490,962 by Viskochil, entitled: "Motor with Overmold Coil Support", filed on Jun. 15, 1995, an array of elastomeric conductors was employed to provide electrical connections between a drive electronics circuit board and a spindle motor of a hard disk drive. In an alternative arrangement described in that patent application metal pins extended from the spindle motor stator and through the base in order to enter a socket on the printed circuit board which in that example was mounted outwardly adjacent to the drive base wall.

While these various prior approaches represent design improvements enabling reduction in height dimension, they typically employ connectors between the circuit board or boards and flex circuits leading to electrical elements within the head/disk assembly and do not lend themselves to electrical contact connections. Also, the designs are not simple, and do not lend themselves to simplified drive assembly along a single assembly direction with the aid of robotics.

SUMMARY OF THE INVENTION WITH OBJECTS

One object of the present invention is to provide an improved and simplified disk drive architecture in a manner overcoming limitations and drawbacks of prior approaches.

Another object of the present invention is to provide an improved and simplified flex circuit connection arrangement within a hard disk drive.

A further object of the present invention is to provide a flex circuit to printed circuit board connection arrangement within a hard disk drive which is established automatically upon installing the printed circuit board onto the disk drive base plate.

One more object of the present invention is to provide an improved flex circuit design and layout for a hard disk drive which minimizes the number of flex circuit bends, and which protects the flex circuit or circuits from exposure in areas outside of the disk drive form factor.

Yet one more object of the present invention is to provide an improved hard disk drive architecture and assembly method which enables the components of the disk drive including a printed circuit board carrying drive electronics to be assembled from one assembly direction generally facing the base plate, thereby facilitating and simplifying robotic assembly of the drive.

Still one more object of the present invention is to provide an improved and simplified hard disk drive architecture which enables simplified installation and removal of a drive electronics circuit board inline with the storage disk or disks and aids realization of a low height profile for the completed drive.

Still another object of the present invention is to provide a low cost hard disk drive which may present a low profile form factor, which may be easily configured by installation and automatic connection of one of a variety of circuit boards providing different interfaces as may be desired by the user, and which may be assembled by automatic machine tools with a minimum of human worker intervention in the assembly process.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF A PREFERRED EMBODIMENT

Figure 1:
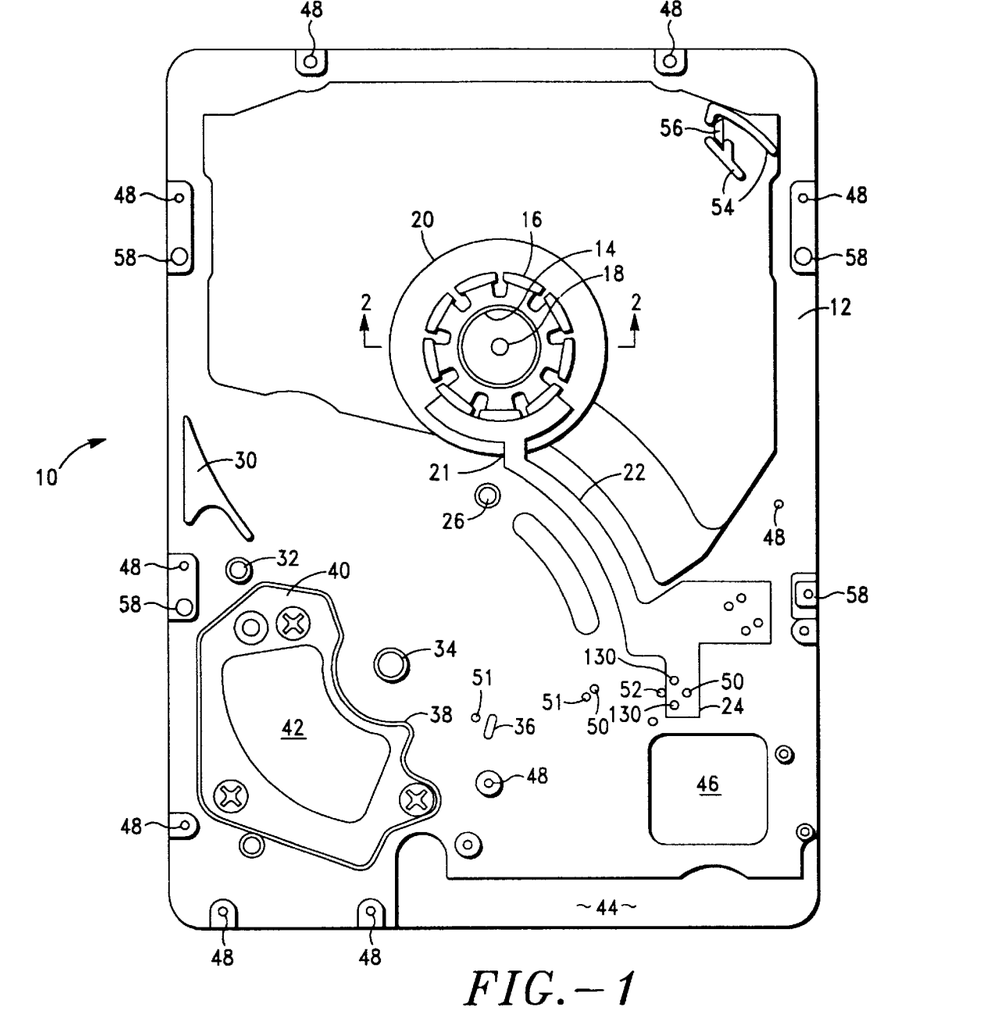
FIG. 1 is a top plan view of a hard disk drive base showing a spindle motor stator and flex circuit arranged in accordance with principles of the present invention.

With reference to FIG. 1, a hard disk drive 10 incorporating features and structural elements, some of which are particularly relevant to this explanation of the invention, and others of which, while not important to an understanding of the present invention, result in a highly useful, advantageous and low cost hard disk drive assembly and are therefore discussed herein. The drive includes a contoured, substantially flat base plate 12 defining certain structural features which may be applied by stamping or machining; most preferably, the flat base plate 12 is formed by injection molding of molten aluminum alloy material in a die casting process. As formed the base plate 12 includes a raised inner annular stator flange 14 to which a stator assembly 16 is attached with a suitable adhesive after being precisely positioned robotically upon the flange 14. An ultraviolet light curable adhesive is preferred for robotic assembly.

Figure 2:
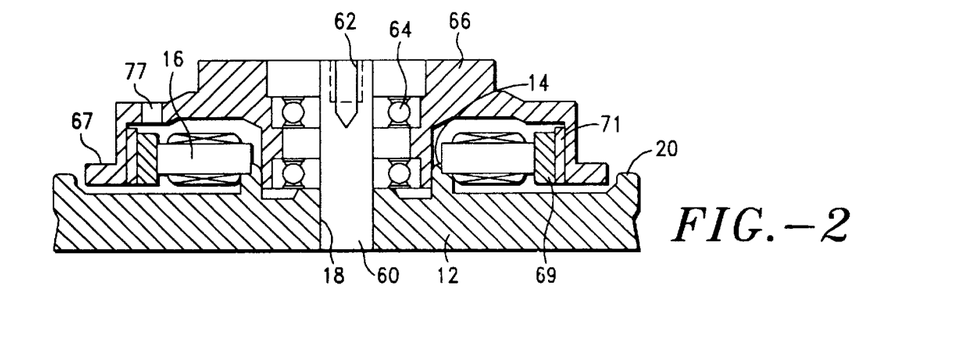
FIG. 2 is an enlarged view in elevation and section along line 2—2 in FIG. 1, illustrating a spindle motor stator and rotor arranged in accordance with principles of the present invention.

The inner flange 14 is concentric with a central opening 18 sized to receive a spindle shaft 60 in a precision fit. The spindle shaft 60, shown in FIG. 2, is press-fit, or more preferably attached by an adhesive to the base plate at the opening 18. The base plate 12 also defines an outer raised annular flange 20 located just beyond a lower flange 67 of a rotating hub 66 of the disk spindle assembly. As formed, the flange 20 defines a narrow circumferential opening 21 through which passes a spindle motor flex circuit 22 carrying connectors to the e.g. four winding connections of the stator assembly. In the present embodiment, the stator assembly 16 defines nine coils and slots, and is connected as a three-phase Y-connected DC brushless motor.

The spindle motor flex circuit 22 terminates in a connection region 24 carrying a plurality of upwardly facing connection pads 130. The region 24 is aligned adjacent to an alignment opening 52 defined by the base 12, and has an opening aligned with a threaded screw opening 50, for a pressure pin connector screw 134, described in greater detail hereinafter. A notch 25 in the connection end 24 (shown in FIG. 8) enables precise alignment to the alignment opening during assembly. After being aligned with the alignment opening 52, the spindle motor flex circuit 22 is attached to an upward face of the base plate 12 by e.g. a pressure sensitive adhesive. The flex circuit 22 may be attached to the stator structure 16 before installation onto the base plate, and may be installed during the same manufacturing operation used to align and install the stator structure 16 onto the flange 14. Alternatively, the spindle motor flex circuit 22 may be mounted onto the base plate 12, followed by installation and connection of the stator structure 16, depending upon the manufacturing process steps employed.

The base plate 12 also includes an inner diameter actuator limit or stop 26. An arcuate slot 28 is defined through the base plate 12 to accommodate a push-pin servowriter having a mechanism for precisely measuring position of a rotary voice coil actuator assembly 82 during servo writing operations in which embedded servo sectors containing coarse and fine head positioning information are written to the storage surfaces of each disk 70A and 70B in this e.g. two-disk example. A side opening 57 is defined in a cover 114, for providing disk access to a clocking head of the servo writer which writes and then reads a clocking track on at least one of the data storage surfaces of the disks 70.

An airflow baffle 30 directs airflow from counter-clockwise disk rotation onto an airvane actuator latch 68 which may be generally in accordance with commonly assigned U.S. Pat. No. 5,319,511 to Lin for "Aerodynamic Actuator Latch with Magnetic Return Spring for Hard Disk Drive", the disclosure thereof being incorporated herein by reference. The actuator latch 68, shown in FIG. 3, mounts on a post 32 staked into an opening defined in the base plate 12 as shown in FIG. 1.

Figure 3:
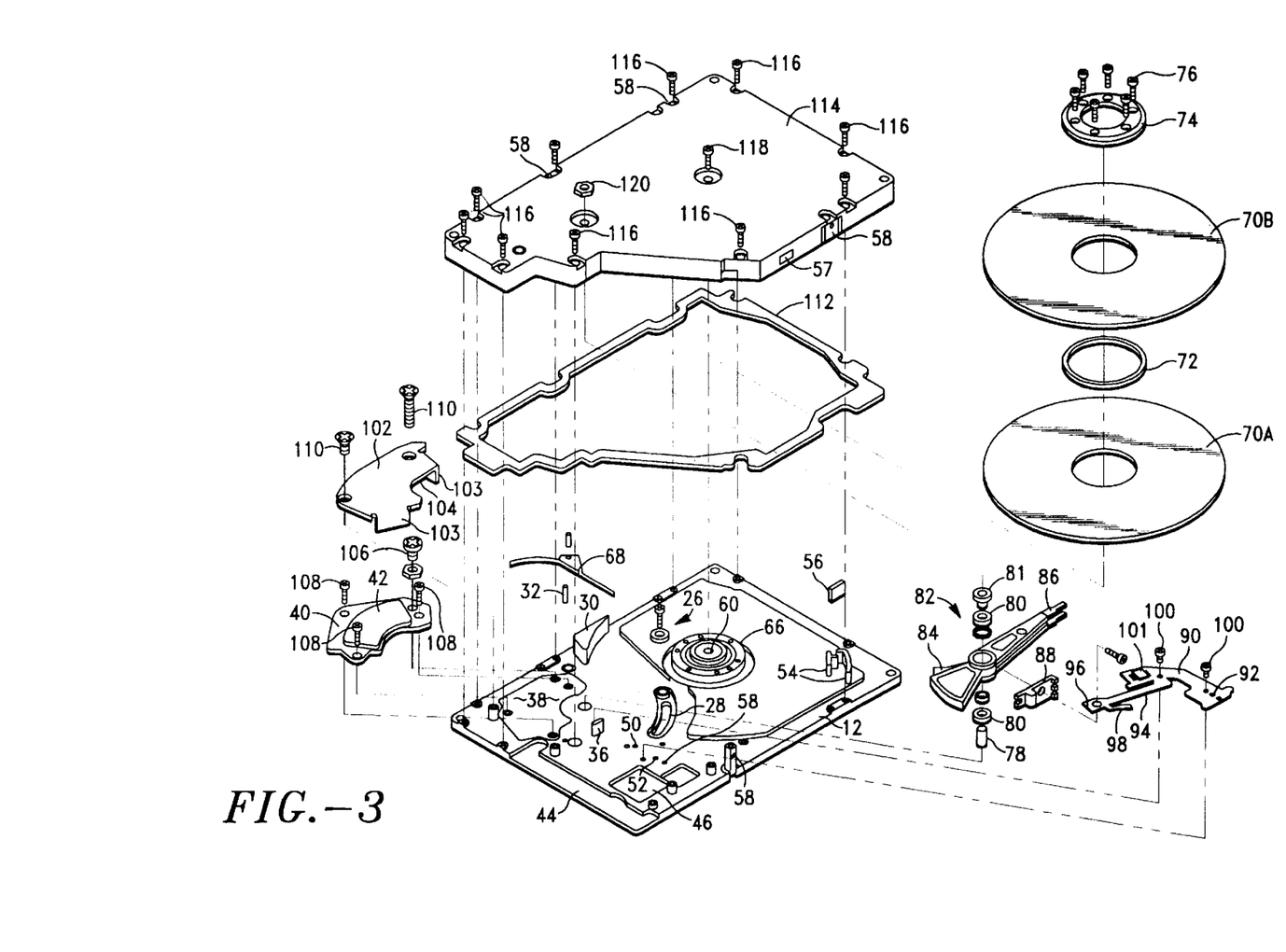
FIG. 3 is an exploded assembly drawing of a head/disk assembly of a hard disk drive including the FIG. 1 base and FIG. 2 spindle motor and arranged for assembly in accordance with principles of the present invention.
Figure 4:
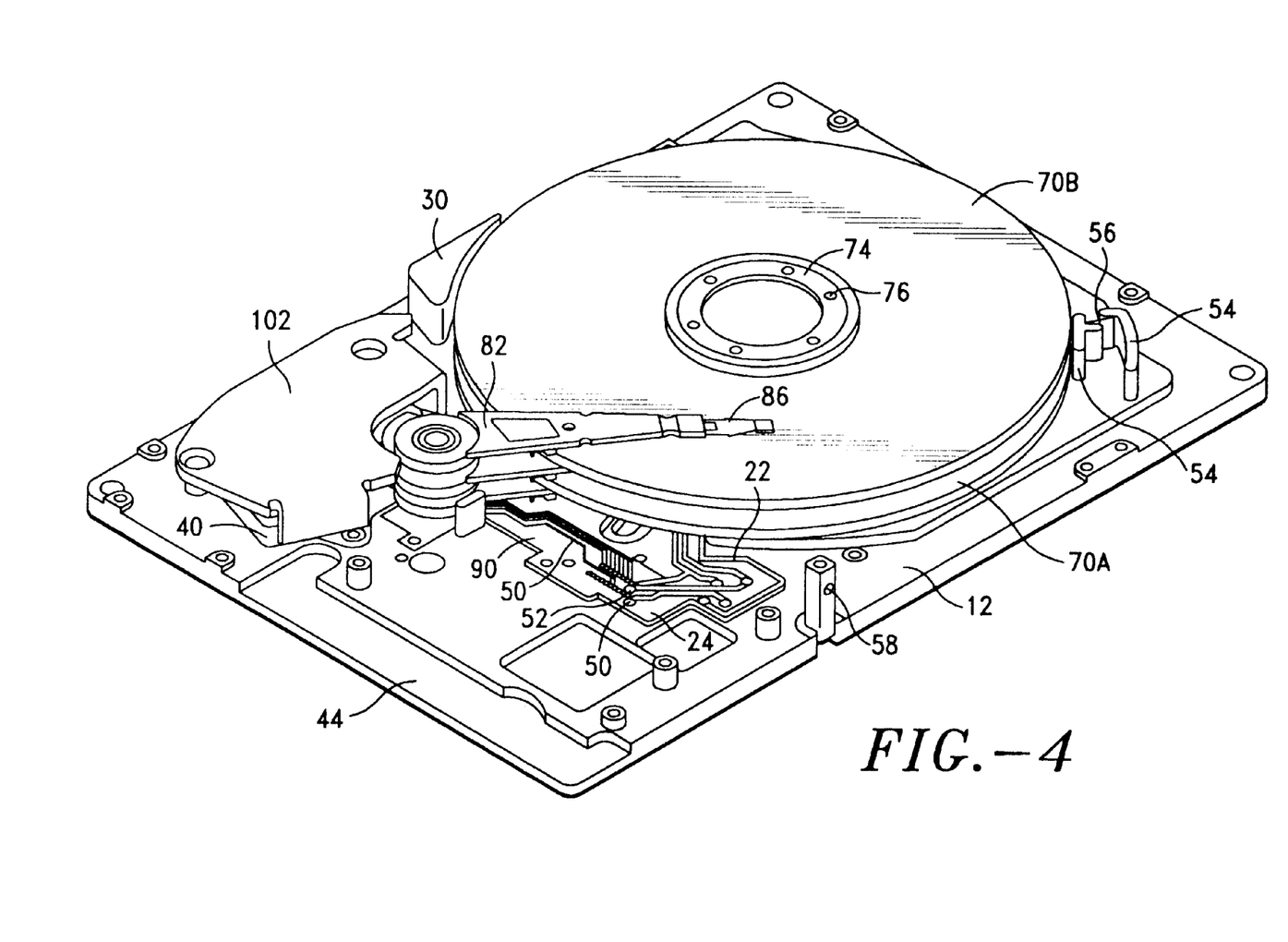
FIG. 4 is an isometric view of the FIG. 3 head/disk assembly following assembly thereof.

Another opening 34 defined in the base plate 12 is for a rotary voice coil actuator shaft 78, also shown in FIG. 3. An elongated post 36 extending upwardly from the upper wall of the base plate 12 serves as a guide for locating and retaining a flexing portion 94 of a voice coil flex circuit 90. A contoured well region 38 receives a lower magnet plate 40 which carries a lower permanent magnet 42 for a voice coil 84 of the actuator 82. Another recessed region 44 is sized to receive and protect an edge connector 124 of a drive electronics circuit board 122. A generally square opening 46 defined through the base plate 12 enables test and diagnostics connections to be made to connection pins of a surface-mounted drive microprocessor carried on the drive electronics circuit board 122. A series of threaded openings 48 in the base plate 12 receive screws 116 which secure a cover 114 onto the base after all of the components comprising a head/disk assembly have been assembled. Two peripheral mounting posts 54 are arranged in an airflow path in one corner of the base plate 12 and retain a micropore filter medium 56 which filters and traps particulates otherwise circulating within the enclosed head/disk assembly during rotation of disks 70. Suitable standard-alignment mounting regions 58 enable the hard disk drive 10 to be mounted within a drive bay of a computer with conventional drive mounting brackets and screw openings, etc.

As already mentioned, the base plate 12 also defines a pair of threaded openings 50 and an alignment opening 52 arranged in a line. The alignment opening 52 is used during head/disk assembly to align the spindle motor flex circuit region 24 and an up facing connection pad end region 92 of the voice coil flex circuit 90. An alignment notch 93 (shown in FIG. 8) facilitates alignment of the end region 98 with the alignment opening 52. Later on, the alignment opening 52 receives an alignment post 132 of the pressure pin connector 126, thereby to register pressure connector pins of the connector 126 with up facing arrays of connection pads 130 of the motor flex circuit 22 and of the actuator flex circuit 90.

Turning again to FIG. 2, the spindle motor includes the spindle shaft 60 which defines a threaded axial opening 62 for a cover screw 118. A pair of preloaded ball-bearing assemblies 64 are secured into a central bore of the hub 66. The hub 66 also supports an e.g. eight-pole permanent magnet ring 69 mounted to a ferromagnetic flux return ring 71, such that the magnet ring 69 faces the motor stator laminations and slots 16. A lower disk 70A is placed on the hub 66 and rests upon the hub flange 67. A disk spacer 72 is then placed onto the hub 66, and a second disk 70B is placed onto the hub 66. The disk assembly is then clamped to the hub 66 by a clamping ring 74 which is screwed onto the hub 66 by clamping screws 76 threading into threaded openings 77 of the hub.

As mentioned the rotary voice coil actuator assembly 82 includes an E-block and a voice coil 84 molded onto the metal E-block. Head assemblies 86 are attached to head arms or tines of the E-block as by ball-swaging techniques. Each head assembly 86 includes a load beam or spring for applying a predetermined preload force to a gimbal-mounted slider and transducer head as well as for providing stiffness to the gimbal and slider in a plane parallel to the surface of an adjacently facing disk 70. A flex circuit mounting fixture 88 is mounted onto the side of the actuator assembly 82 and receives an actuator end 96 of the actuator flex circuit 90. Minute head wires are then attached to the actuator end 96, while a voice coil connection region 98 of flex circuit 90 connects directly to pins of the rotary voice coil 84. The flex circuit 90 also supports and connects a read preamplifier/write driver/head select circuit 101.

The voice coil actuator assembly 82 and voice coil flex circuit 90 are assembled as a subassembly before the actuator pin 78 is installed into its opening 34 in the drive base 12. The actuator installation occurs e.g. after the lower magnet plate 40 is installed but before the disks 70 are installed on the hub 66. After the rotary voice coil actuator assembly 82 is mounted to the base plate 12, two screws 100 thread into openings in the base plate 12 to secure the actuator flex circuit connection end region 98 in proper alignment with the alignment opening 52 in the base plate 12. Also, after installation of the actuator assembly 82, a threaded stud 81 is installed in a threaded opening of actuator shaft 78. Subsequently, a nut 120 will secure the cover 114 to the shaft 78 to provide additional mechanical rigidity to the completed head/disk assembly.

After the actuator 82 is installed and the head assemblies 86 are loaded onto their respective storage surfaces of the disks 70A and 70B, an upper magnet flux return plate 102 is mounted over the lower plate 40 and actuator voice coil 94. The upper plate 102 includes folded flux return end tabs 103 and supports an upper permanent magnet 104. A post 106 provides a stand-off between the lower magnet plate 40 and the upper magnet plate 102, and also functions as an outer diameter crash stop which limits radially outward excursions of the voice coil actuator 82 such that the heads do not go beyond the outer edges of the disks 70. Screws 108 are used to secure the lower magnet plate 40 to the base plate 12, while screws 110 secure the upper magnet plate 102 to the base 12. The permanent magnets 42 and 104, preferably of a ceramic structure comprising rare-earth metal element neodymium, provide a very high flux intensity within a magnetic gap through which the voice coil 84 moves in response to driving currents passing through the voice coil. Current flow direction governs direction of rotation of the voice coil actuator structure 82 relative to disks 70.

A gasket 112 of resilient material is placed between a lower peripheral edge of the cover 114 and the bottom face of the base plate 12, thereby to seal an interior space including disks 70A and 70B and rotary voice coil actuator assembly 82 and associated heads. The gasket 112 extends over portions of the thin spindle motor flex circuit 22 and the thin actuator flex circuit 90.

Figure 5:
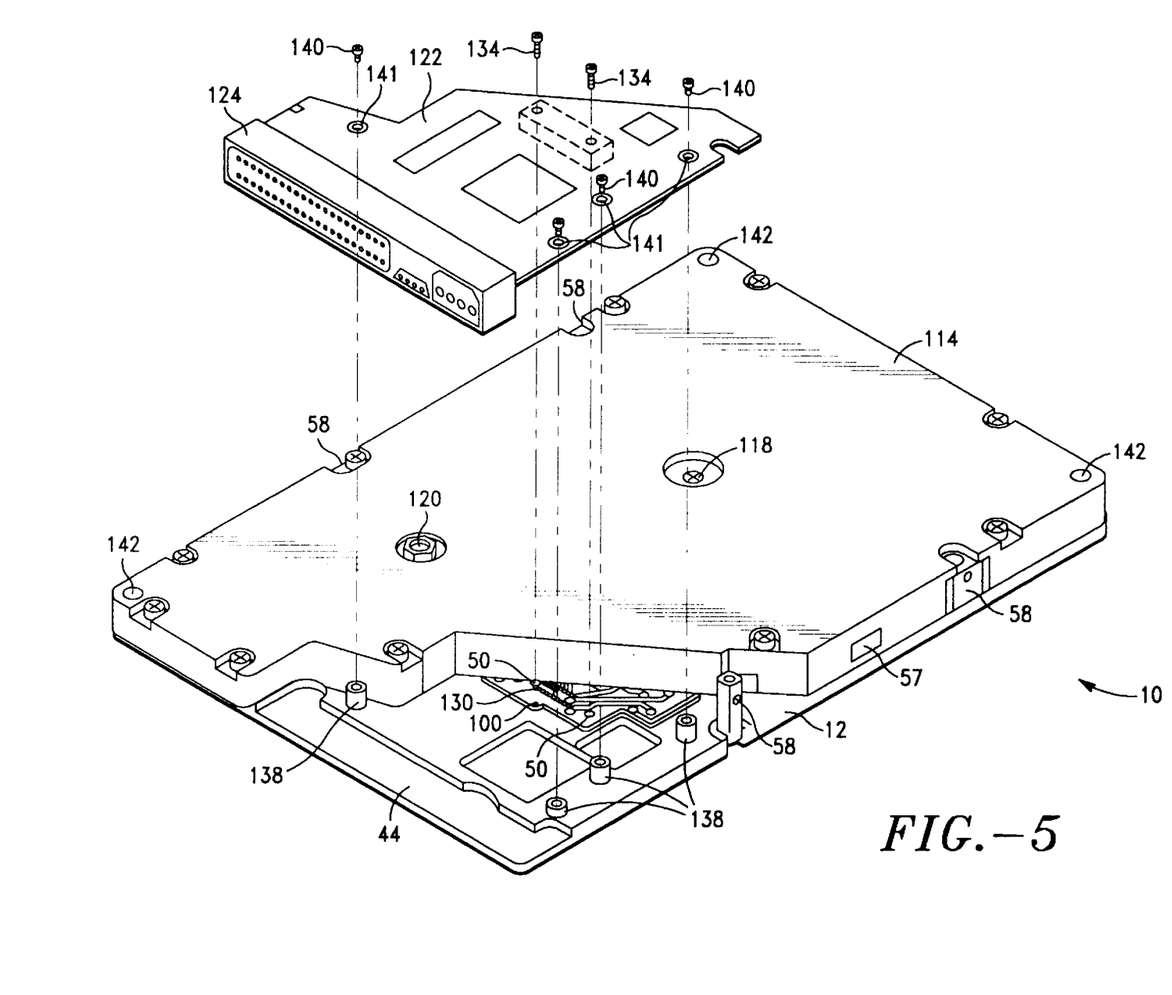
FIG. 5 is an exploded isometric view of the FIG. 4 head/disk assembly following installation of a cover and with a drive electronics circuit board to be installed in accordance with principles of the present invention.
Figure 6A:
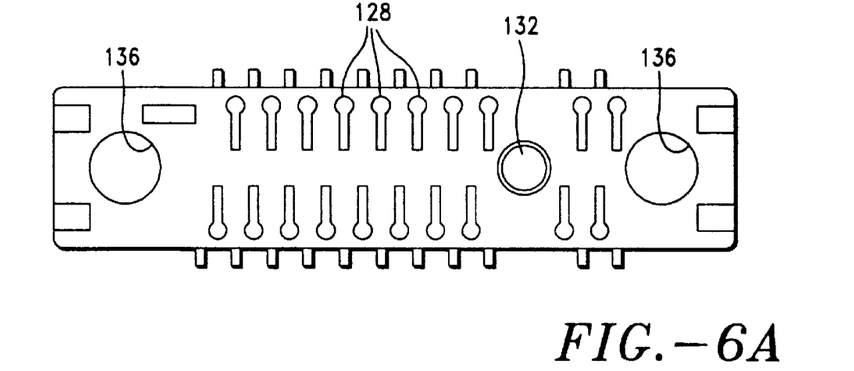
FIGS. 6A and 6B are bottom plan and side elevational views, respectively, of a pressure pin connector of the FIG. 5 drive electronics circuit board with contact pins aligned to contact aligned contact pads of a spindle motor flex circuit and an actuator circuit flex circuit as arranged in FIG. 5.
Figure 6B:
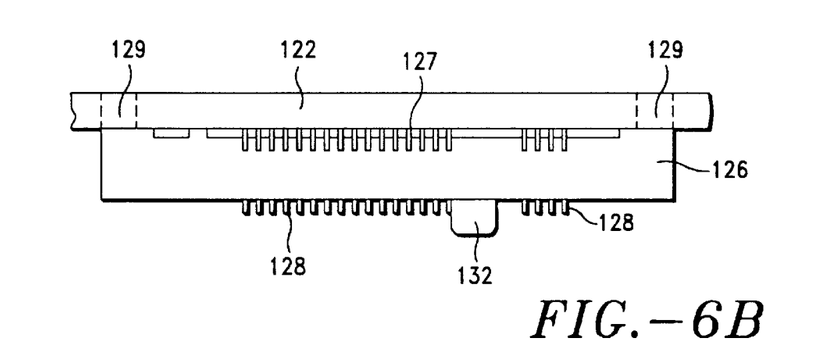
Figure 7:
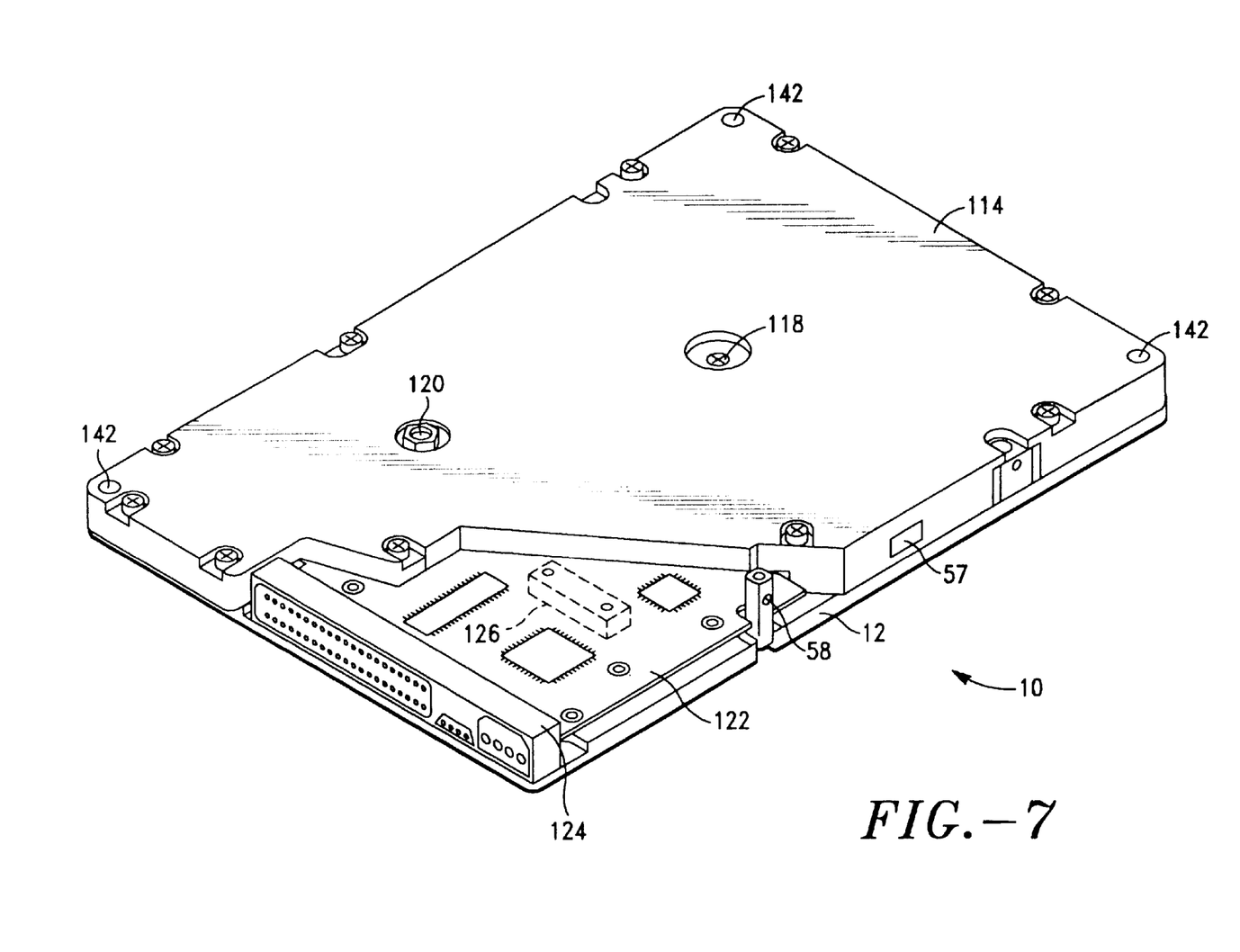
FIG. 7 is an isometric view of the FIG. 5 hard disk drive following final assembly and mounting of the electronics printed circuit board to the assembled head/disk assembly of FIG. 5.
Figure 8:
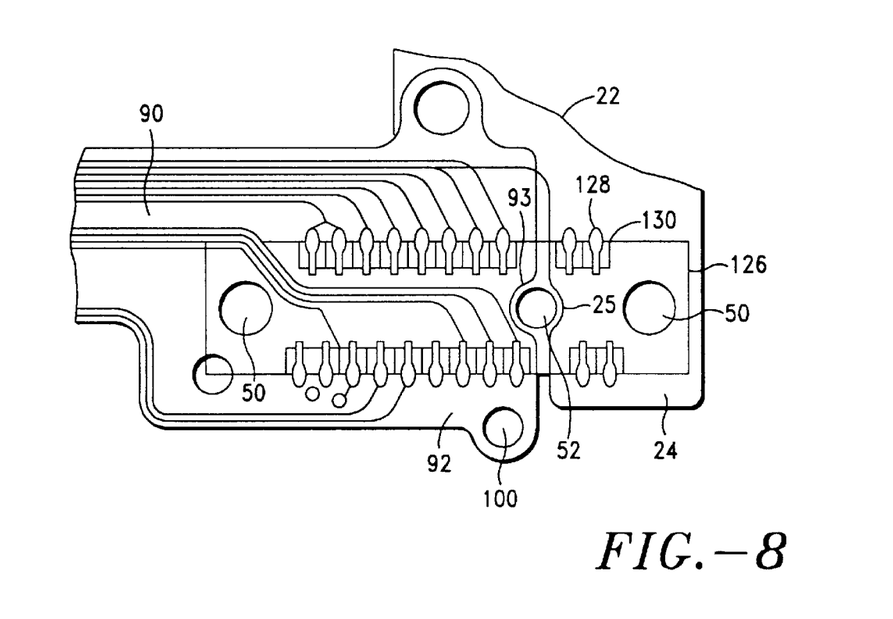
FIG. 8 is an X-ray plan view of the FIGS. 6A–B pressure pin connector downwardly engaging upwardly facing connection pads of the spindle motor flex circuit and actuator/head flex circuit following the FIG. 7 final assembly.

FIG. 5 illustrates completion of assembly of the head/disk assembly and installation of a printed circuit board 122 carrying drive electronics including the pressure pin connector 126 shown in FIGS. 6A, 6B and 8, and in broken line hidden view in FIG. 5. The circuit board 122 is e.g. a double sided, multiple layer laminar construction carrying arrays of interconnects between a plurality of VLSI circuits mounted in surface mount packages. These circuits include an embedded drive microcontroller executing control program routines stored in internal ROM and in reserved tracks of one of the disks 70A or 70B and transferred to a dynamic random access memory (DRAM) array also on the circuit board 122. A read/write channel integrated circuit provides an analog signal interface with the heads via the rotary actuator flex circuit 90 and the read channel preamplifier circuit 101. Finally, a digital drive electronics VLSI application specific integrated circuit (ASIC) provides data sequencing, DRAM memory management, drive interface, servo circuit and servo driver interface, and microcontroller interface functions. These five integrated circuits may be suitably arranged on the generally triangular printed circuit board 122 with any suitable layout, their functions remain essentially as described, for example, in commonly assigned U.S. Pat. No. 5,465,343 to Henson et al., entitled: "Shared Memory Array for Data Block and Control Program Storage in Disk Drive", the disclosure thereof being incorporated herein by reference thereto. The Henson et al. patent explains how it is practical for the drive microcontroller to execute firmware routines stored in the on-board DRAM without requiring a separate program memory array, thereby reducing the number of chips required for the printed circuit board 122.

As shown in FIGS. 6A, 6B and 8, the pressure pin connector 126 includes an array of pressure pins 128 which are aligned to contact the connection pads of the spindle motor flex circuit connection end 24 and the actuator flex circuit connection end 92. The two flex circuit ends 24 and 92 are arranged against the alignment opening 52 of the base plate 12 as best shown in FIG. 8. As aligned, the connection pads 130 of each flex circuit 24, 92 align with the array of pressure pins 128 of the connector 126, such that when the alignment pin 132 of the connector 126 enters the alignment opening 52, and when the screws 134 pass through aligned openings 136 of the connector 126 and enter aligned threaded openings 50 defined in the base plate 12, each pressure pin 128 makes a positive electrical circuit contact with an adjacently facing pad 130 of one of the flex circuit ends 24, 92. The connector 126 also includes an array of surface mounting contacts 127 for surface mounting to connection pads of the printed circuit board 122, as shown in FIG. 6B. Locator pins 129 extending from the connector 126 enter aligned holes defined in the printed circuit board 122 and thereby register the contacts 127 with facing connection surface mount pads of the circuit board.

The printed circuit board 122 also includes a plurality of openings 141 which align with threaded mounting plateaus 138 extending upwardly from the upper major surface of the base plate 12. The openings are slightly oversize with respect to screws 140 which secure the circuit board 122 to the base 12, so that positive alignment of the circuit board 122 to the base plate 12 is guided primarily by the alignment pin 132 of the connector 126 and by the screws 134 which secure the connector 126 (and adjacent portion of circuit board 122) to the base plate 12 in correct alignment with the pads 130 of the flex circuit ends 24 and 92. Corner openings 142 in the cover 114 and base plate 12 are provided as handling fixturing points for robotic assembly and for registration and clamping at the servo writer station. As completed, the disk drive 10 provides a height compacted form factor which may be installed in any convenient location within a computing appliance or drive array. With 5.25 inch diameter storage disks 70, overall package dimensions follow the standard 5.25 inch hard disk drive form factor footprint, except for the height dimension which is approximately ⅝ths inch. Accordingly, a significantly reduced height form factor may be realized in a disk drive architecture which employs an assembly procedure lending itself entirely to robotic assembly from a single assembly direction for all components, including the printed circuit board 122.

Robotic assembly of the hard disk drive 10 includes the following steps:

1. Align and install the spindle motor flex circuit 22 to the base plate 12 with a suitable adhesive, being sure that the connection end 24 is aligned with the reference alignment opening 52 and with threaded opening 50.
2. Align and install the spindle motor stator 16 onto flange 14 of the base plate 12, and connect stator wires to the pads of the spindle motor flex circuit.
(Alternatively, the spindle motor stator and flex circuit may be combined as a subassembly and installed onto the base plate in one step.)
3. Install spindle assembly including shaft 60, bearings 64, hub 66, magnet ring 69 and flux return ring 71 as a single unit by aligning and securing the shaft 60 in the opening 18 and test spindle motor for rotation via flex circuit 22 (all electrical connections between stator coils and flex circuit securely made).
4. Install other features of the base plate 12 including inner crash stop 26, air latch pivot pin 32 and air vane actuator latch 68, and lower magnet plate 40 and lower magnet 42 with screws 108.
5. Install rotary voice coil actuator assembly 82 and flex circuit 90, dress flexible portion 94 around post 36, and secure flex circuit 90 with screws 100 to base plate 12 after making sure that connection end 92 is in proper registration with alignment opening 52 and threaded opening 50.
6. Install lower disk 70A, disk spacer 72, second disk 70B and disk clamp 74 onto hub 66.
7. Load heads onto disks 70A and 70B.
8. Install upper magnet plate 102 and upper magnet 104 with screws 110 thereby limiting rotary actuator excursion to disks 70 by outer crash stop 106.
9. Install filter medium 56 in filter receptacle 54.
10. Install cover gasket 112, and cover 114 with screws 116.
11. Move assembly to servo writing station and servo write disks via port 28 in base, and then seal angled port 28 and side port 57 with adhesive seals before removing assembly from clean room assembly environment.
12. Install circuit board 122 with screws 134 through connector 126 and with screws 140, thereby completing disk drive assembly.

The drive may then be placed into an environmental chamber and operated in a self-scan mode during an initial bum-in interval to establish reference operating parameters and demonstrate reliability of the completed disk drive 10. After completing self-scan, the drive 10 is ready for delivery to a user.

Those skilled in the art will appreciate that the foregoing assembly steps may be carried out entirely by robots with assembly processes operating in one direction of movement relative to base plate 12. All components comprising the completed disk drive 10 are assembled by moving them in a dimension perpendicular to and toward the upward surface of the base 12. As assembled, all of the circuitry, particularly the delicate flex circuits 22 and 90, is protected by the contours of the drive base 12 and cover 114, and the mounting post 58 extending from the base 12 further serves to protect and stand off other structure from inadvertent, unwanted contact with circuits carried on an outer surface of the printed circuit board 122. The resultant disk drive product may thus be realized at very low cost and with high reliability.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A hard disk drive comprising:
   a substantially flat base plate having one face defining a first portion and a second portion,
   at least one rotating data storage disk,
   a disk spindle motor for rotating the disk and formed on the base plate and including
      a spindle motor flex circuit extending from the spindle motor and including a spindle motor connection end defining a first array of up facing connecting pads and secured to the base plate at a connection location on the base plate established by at least one reference feature defined by the base plate,
   stationary permanent magnets in a magnet structure mounted to the base plate and defining a magnetic field gap,
   a rotary actuator assembly rotatably secured to the base plate and including a rotary voice coil for rotating in the magnetic field gap in response to currents passing through the coil, a plurality of head arms, each head arm including a head suspension assembly for supporting a head slider in proximity to a storage surface of the rotating disk, the rotary actuator assembly also including an actuator flex circuit extending from the actuator assembly and having an actuator connection end defining a second array of up facing connecting pads and secured to the base plate at the connection location established by the at least one reference feature,
   a cover and cover gasket mounted to cover and seal the first portion of the base plate enclosing the data storage disk, disk spindle motor, magnet structure, rotary actuator assembly and flex circuits and leaving uncovered the second portion of the base plate including the spindle motor connection end and the actuator connection end, and
   a printed circuit board carrying drive electronics and a connector array of pressure pins facing the spindle motor connection end and the actuator connection ends so that the pressure pins apply a contact force to said first and second arrays of connecting pads as an alignment means of the connector array registers with the reference feature of the base plate when the printed circuit board is mounted to the second portion of the base plate.

2. The hard disk drive set forth in claim 1 wherein the spindle motor flex circuit is secured to the base plate at the motor spindle connection end by an adhesive.

3. The hard disk drive set forth in claim 1 wherein the actuator flex circuit connection end is secured to the base plate by at least one screw engaging a threaded opening defined in the base plate.

4. The hard disk drive set forth in claim 1 wherein the at least one reference feature comprises a reference opening defined in the base plate, and wherein the alignment means for registering with the reference feature comprises an alignment pin extending from the connector array for entering the reference opening.

5. The hard disk drive set forth in claim 1 wherein the connector array and printed circuit board further includes at least one screw opening forming the at least one reference feature for receiving a screw therethrough, wherein the base plate includes a threaded screw opening for receiving the screw and for providing the at least one reference feature such that engagement of the screw through the screw opening and into the threaded screw opening in the base plate aligns the connector array with the first and second arrays of up facing connecting pads.

6. The hard disk drive set forth in claim 4 wherein the spindle motor connection end and the actuator connection end adjacently face each other and are separated by the reference opening and alignment pin, and wherein the first and second arrays of up facing connecting pads are arranged in substantial longitudinal alignment.

7. The hard disk drive set forth in claim 6 wherein the connector array and printed circuit board include two screw openings spanning the pressure pins, and wherein the base plate includes two threaded screw openings aligned with the two screw openings for receiving two screws for securing the connector array and printed circuit board to the base plate so that the connector pins are in electrical contact with the first and second arrays of up facing pads.

8. The hard disk drive set forth in claim 1 wherein the cover and cover gasket are generally trapezoidal and leave one corner region of the base plate uncovered, and wherein the printed circuit board is generally triangular and is secured to the base plate at the one uncovered corner region.

9. The hard disk drive set forth in claim 8 wherein the base plate defines an opening in the uncovered corner region enabling access to pinouts of an electronic circuit mounted to the printed circuit board on a side thereof facing the base plate.

10. The hard disk drive set forth in claim 8 wherein the printed circuit board comprises an external edge connector means connected to the printed circuit board along an externally facing edge thereof for enabling external power, control and signal connections to be made with the hard disk drive, the external edge connector means having an outer longitudinal face in substantial alignment with an outer edge of the base plate.

11. The hard disk drive set forth in claim 10 wherein the base plate defines a recess region for receiving the external edge connector means.

12. A hard disk drive comprising:
   a base having a generally flat major surface divided into a first portion and a second portion,
   a spindle assembly secured to the base within the first portion and extending outwardly from the major surface and including a spindle motor and at least one data storage disk rotationally mounted to the spindle,
   a flat spindle motor trace circuit array extending along the major surface from the first portion to a predetermined first terminal segment on the major surface within the second portion, the first terminal segment having a plurality of outwardly facing electrical connection pads, a rotary voice coil actuator assembly secured to the base within the first portion and extending outwardly from the major surface including a voice coil and at least one head transducer confronting a storage surface of the disk, a flat actuator trace circuit array extending along the major surface from the first portion to a predetermined second terminal segment on the major surface within the second portion, the second segment location having a plurality of outwardly facing electrical connection pads, a cover for covering and sealing the first portion, the spindle motor trace circuit array and the actuator trace circuit array passing between the major surface of the base and the cover, a printed circuit board secured to the base within the second portion and carrying disk drive electronics and at least one external connector enabling external connections to be made to the hard disk drive, the printed circuit board further comprising pressure pin connector means having pressure pins for applying a contact force to the electrical connection pads of the first and second terminal locations and so aligned oppositely facing the major surface so that when the printed circuit board is mounted to the base at the second portion, the pressure pins of the pressure pin connector means confront and contact the connection pads of the motor trace circuit array and the actuator trace circuit array.

13. The hard disk drive set forth in claim 12 wherein the first terminal segment and the second terminal segment are adjacently aligned on the second portion of the major surface, and the pressure pin connector means comprises a single pressure pin connector array.

14. The hard disk drive set forth in claim 12 wherein the base is generally rectangular and wherein the second portion is generally defined in one corner region of the base, an adjacent corner region being part of the first portion and including at least portions of the rotary voice coil actuator assembly.

15. The hard disk drive set forth in claim 14 wherein the printed circuit board is attached to the second portion of the base so as to be in substantial planar alignment with the at least one data storage disk.

16. The hard disk drive set forth in claim 12 wherein the base includes one reference feature formed adjacent to the first and second terminal locations, and wherein the pressure pin connector means includes a structural feature for registering with the reference feature to establish alignment of the pressure pins with the electrical connection pads of the first and second terminal locations.

17. The hard disk drive set forth in claim 16 wherein the pressure pin connector means comprises a connector array, and wherein the one reference feature comprises an opening defined in the base, and wherein the alignment means for registering with the reference feature comprises an alignment pin extending from the connector array for entering the reference opening.

18. The hard disk drive set forth in claim 12 further including at least one fastener for securing the printed circuit board to the base, the fastener being located adjacent to the pressure pin connector means to cause the pressure pins to contact the electrical connection pads.

* * * * *